(12) United States Patent
Ng (10) Patent No.: US 10,690,190 B2
(45) Date of Patent: Jun. 23, 2020

(54) TORQUE TRANSFER COUPLER WITH ANTI-SLIP FEATURE FOR ROLLER BLIND DRIVE MECHANISM

(71) Applicant: ZMC Metal Coating Inc., Woodbridge (CA)

(72) Inventor: Philip Ng, Thornhill (CA)

(73) Assignee: ZMC Metal Coating Inc., Woodbridge Ontario (CA)

( * ) Notice: Subject to any disclaimer, the term of this patent is extended or adjusted under 35 U.S.C. 154(b) by 0 days.

(21) Appl. No.: 16/403,740

(22) Filed: May 6, 2019

(65) Prior Publication Data

US 2019/0323561 A1 Oct. 24, 2019

Related U.S. Application Data

(62) Division of application No. 15/379,886, filed on Dec. 15, 2016, now Pat. No. 10,309,461.

(60) Provisional application No. 62/268,250, filed on Dec. 16, 2015.

(51) Int. Cl.
*F16D 1/08* (2006.01)
*E06B 9/42* (2006.01)
*E06B 9/72* (2006.01)
*F16D 1/10* (2006.01)

(52) U.S. Cl.
CPC .............. *F16D 1/0805* (2013.01); *E06B 9/42* (2013.01); *E06B 9/72* (2013.01); *F16D 1/0811* (2013.01); *F16D 1/10* (2013.01); *F16D 2001/102* (2013.01)

(58) Field of Classification Search
CPC ........ F16D 1/0805; F16D 1/0811; F16D 1/10; F16D 2001/102; E06B 9/42; E06B 9/72
See application file for complete search history.

(56) References Cited

U.S. PATENT DOCUMENTS

| 5,749,536 A * | 5/1998 | Specht ................... B60R 22/46 242/374 |
| 10,309,461 B2 * | 6/2019 | Ng ............................. F16D 1/10 |
| 2003/0015301 A1* | 1/2003 | Killo ........................ E06B 9/50 160/310 |
| 2005/0087313 A1* | 4/2005 | Nichols, Jr. ............ E06B 9/174 160/310 |
| 2010/0175838 A1* | 7/2010 | Faller ...................... E06B 9/322 160/310 |
| 2012/0031571 A1* | 2/2012 | Mullet ..................... E06B 9/40 160/310 |

(Continued)

*Primary Examiner* — Beth A Stephan
(74) *Attorney, Agent, or Firm* — Locke Lord LLP; Scott D. Wofsy; Joshua L. Jones (57) ABSTRACT

A torque transfer coupler for a roller blind. The torque transfer coupler has a central body securable to an electric motor and includes one or more torque transfer elements engaging the interior of the blind's roller tube. The coupler includes an anti-slip member having one or more resilient portions having a rest position and a deflected position. When, in their rest positions the resilient portions have a dimension larger than the cross sectional area of the roller tube. When in their deflected positions and received within the roller tube the resilient portions engage the interior surface of the roller tube resisting the withdrawal of the torque transfer coupler, and the electric motor secured thereto, from the interior of the roller tube.

4 Claims, 7 Drawing Sheets

(56) References Cited

U.S. PATENT DOCUMENTS

2015/0368968 A1* 12/2015 Smith ..................... E06B 9/62
                                                        160/311
2016/0369558 A1* 12/2016 Kirby ..................... E06B 9/80

* cited by examiner

TORQUE TRANSFER COUPLER WITH ANTI-SLIP FEATURE FOR ROLLER BLIND DRIVE MECHANISM

CROSS REFERENCE TO RELATED APPLICATIONS

This application is a divisional of U.S. patent application Ser. No. 15/379,886 filed on Dec. 15, 2016, which claims the benefit of priority to U.S. Provisional Patent Application No. 62/268,250, filed Dec. 16, 2015, each of which are incorporated by reference in their entirety.

FIELD

This invention relates generally to the field of roller blinds, and in particular to a new and unique torque transfer coupler having an anti-slip feature for use in association with a roller blind drive mechanism.

BACKGROUND

Roller blinds are commonly used on windows and openings in walls of buildings to prevent or limit light intrusion, for privacy purposes, for insulating purposes, and generally to enhance esthetics. Traditionally, roller blinds have been operated through the use of a cord, chain or wand that operates a clutch to rotate a roller tube, in a first direction that causes a deployment of the blind, or in a second direction causing the blind to be retracted and stored upon the roller tube. Increasingly, the traditional cord, chain or wand has been replaced with the use of a small electric motor causing the roller tube to rotate in one direction or the other. In order to help maintain a low profile for the roller blind, motor manufacturers have developed motors having housings in the form of a relatively small diameter, elongate, tubular structure such that the motors can be received within an end of the blind's roller tube. The outer end of the motor is rigidly secured to an end bracket of the roller blind, with the inner end of the motor housing secured to, or otherwise capable of transmitting torque to, the roller tube, permitting the motor to rotationally drive the tube in a forward or backward direction. To accommodate motors of different lengths, and to permit the motor to be readily removed from within the roller tube for servicing, in many instances torque is transferred from the motor to the roller tube through a splined coupler on the motor that engages corresponding splines, ribs or channels within the interior of the roller tube.

Roller tubes incorporating such electric motors can make installation somewhat more difficult. The motors themselves can add significant weight to the roller blind, making it more difficult for an installer to hold the blind in place while it is being secured about a window or opening. Further, in instances where the blind is of a significant length, since the motor is positioned at one end of the roller tube, that end of the roller tube tends to be heavier than the opposite end. In the case of long roller tubes, this added weight can present further installation challenges for the installer. Since in most instances the motor is merely slid into an end of the roller tube, the installer must be careful not to lower the "motor end" of the tube to a point where the motor may slide longitudinally and fall from the end of the roller tube. If the motor were to fall the motor could cause damage to itself, to an object that it hits on its descent, or to individuals.

SUMMARY

Further aspects of the invention will become apparent from the following description taken together with the accompanying drawings.

In one aspect the invention provides a torque transfer coupler for a roller blind, the roller blind having a roller tube having a generally hollow interior capable of receiving an electric motor within an end thereof, the motor for imparting rotational movement to the roller tube, the torque transfer coupler comprising a central body securable to the electric motor and receivable within the interior of the roller tube, said central body including one or more torque transfer elements engaging the interior of the roller tube when the motor is received therein such that rotational torque is transferred through said central body from the motor to the roller tube; and an anti-slip member having one or more resilient portions, said one or more resilient portions having a rest position and a deflected position, when said resilient portions are in said rest position said one or more anti-slip members having a dimension larger than the cross sectional area of the hollow interior of the roller tube such that insertion of said torque transfer coupler into the roller tube causes said resilient portions to be moved to said deflected position, when in said deflected position and received within the roller tube said resilient portions engaging the interior surface of the roller tube resisting the withdrawal of the torque transfer coupler, and the electric motor secured thereto, from the interior of the roller tube.

The invention also provides torque transfer coupler for a roller blind, the roller blind having a roller tube with a generally hollow interior capable of receiving an end of an electric motor therein, the electric motor imparting rotational movement to the roller tube, the torque transfer coupler comprising a generally circular, flexibly resilient, disc releasably secured to the end of the motor, said disc having a rest position and a deflected position, the exterior diameter of said disc larger when in said rest position than when in said deflected position, when in said rest position the exterior diameter of said disc larger than the cross sectional area of the hollow interior of the roller tube such that insertion of said disc into the roller tube causes said disc to be moved to said deflected position wherein an exterior edge of said disc engages the interior surface of the roller tube to assist in the transmission of rotational torque from the motor to the roller tube and to resist the withdrawal of the electric motor from the interior of the roller tube.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

The present invention may be embodied in a number of different forms. The specification and drawings that follow describe and disclose some of the specific forms of the invention.

Figure 1:
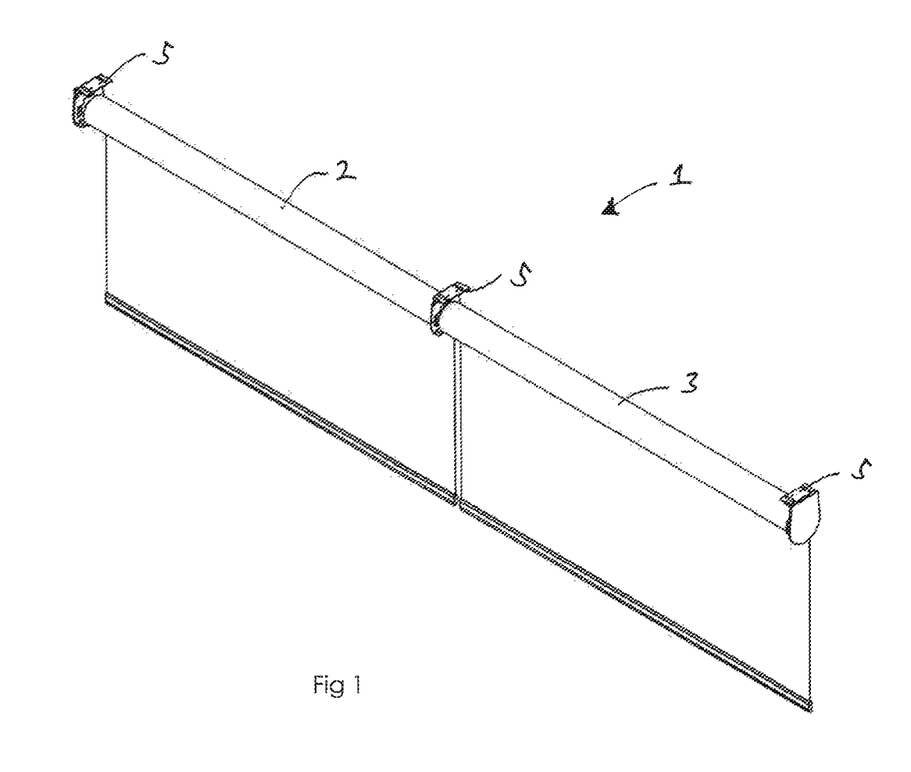
FIG. 1 is an upper perspective view of a typical roller blind assembly having two roller blinds mounted end to end along the same longitudinal axis.
Figure 2:
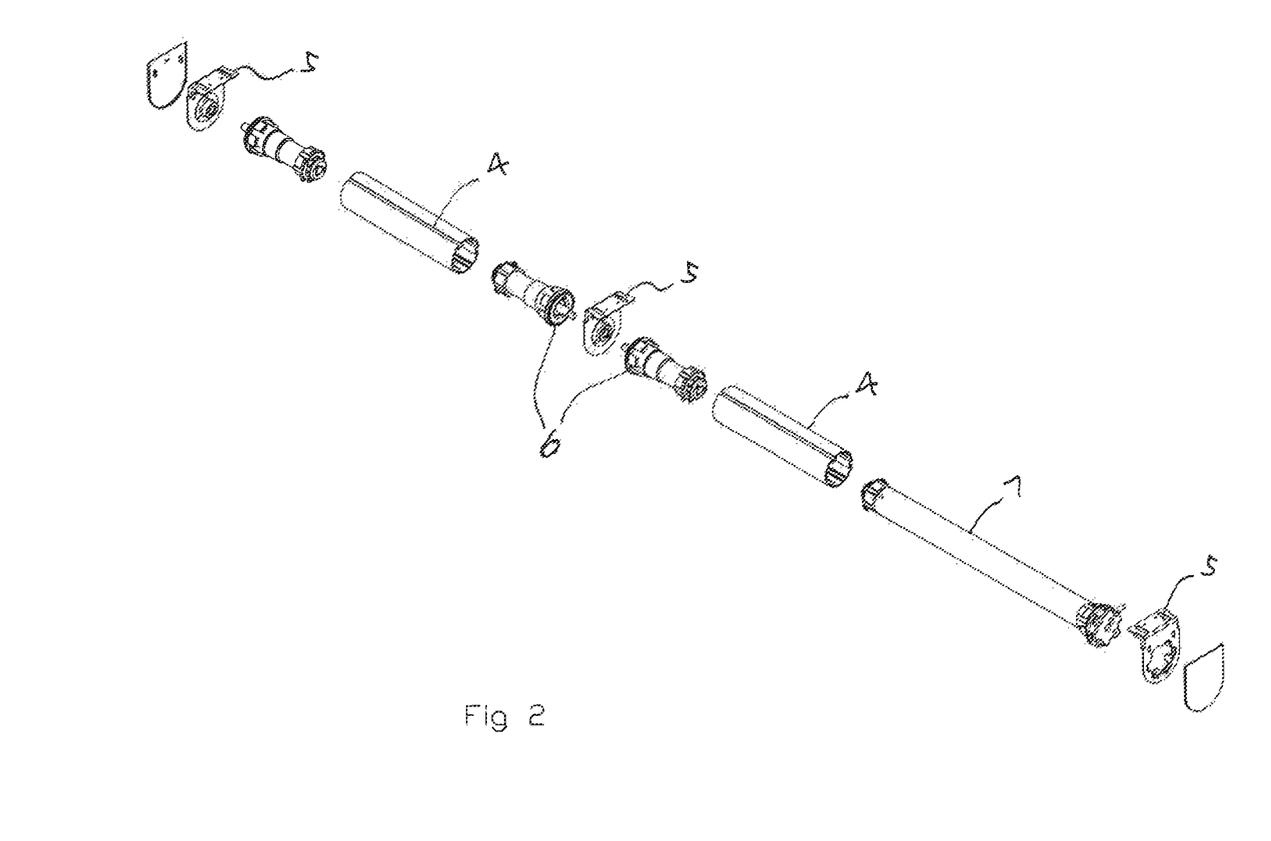
FIG. 2 is an exploded view of the roller blind found in FIG. 1, without the blind fabric.
Figure 3:
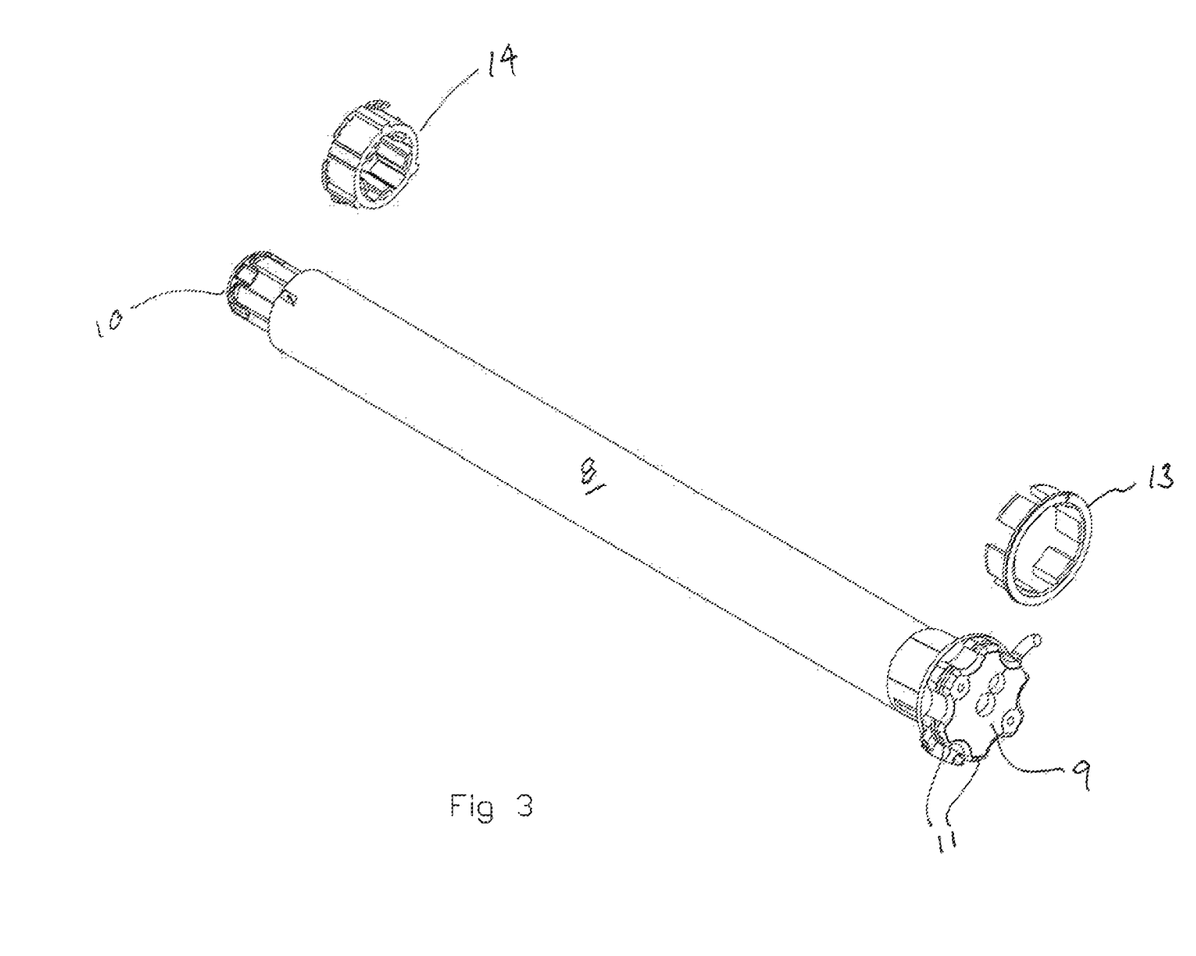
FIG. 3 is a partially exploded view of the electric motor of FIG. 2.

With reference to FIGS. 1 and 2, there is shown a relatively generic roller blind 1 that is comprised of two roller blind portions 2 and 3 that are, in this configuration, connected end to end such that they are raised and lowered together. Each blind portion is, itself, a relatively standard roller blind that includes a roller tube 4 around which blind fabric is wound. The roller tubes are supported or hung from a window or opening by brackets 5. A drive transfer mechanism 6 connects the two roller tubes in an end to end configuration to permit them to rotate in unison. The drive transfer mechanism may be any one of a variety of different structures commonly used in the art.

In the case of the particular roller blind shown in FIGS. 1 and 2, rather than being operated by a standard clutch mechanism driven by a cord, chain or wand, roller blind 1 is operated through use of an electric motor 7. Motor 7 includes an elongate, generally cylindrical, outer housing 8 that is received within a hollow end of one of the roller tubes 4. Motor 7 further includes an outer end 9 that remains exterior to the roller tube and an inner end 10 that is received within the hollow interior of the roller tube. Outer end 9 would typically have incorporated into it means 11 that engage one of brackets 5 to anchor outer end 9 to the bracket and to prevent relative rotation therebetween. A bushing 13 may be inserted into the end of the roller tube prior to insertion of motor 7 in order to help center outer end 9 and to help prevent motor wobble.

Figure 4:
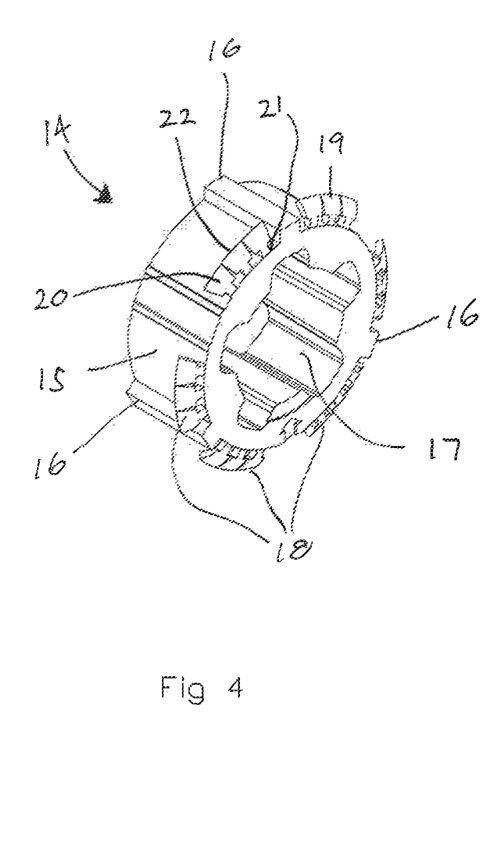
FIG. 4 is an upper side perspective view of a torque transfer coupler with an anti-slip feature in accordance with an embodiment of the invention.
Figure 5:
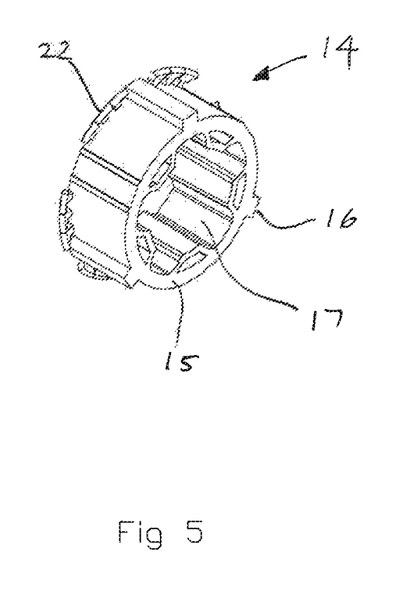
FIG. 5 is an upper rear perspective view of the torque transfer coupler shown in FIG. 4.
Figure 6:
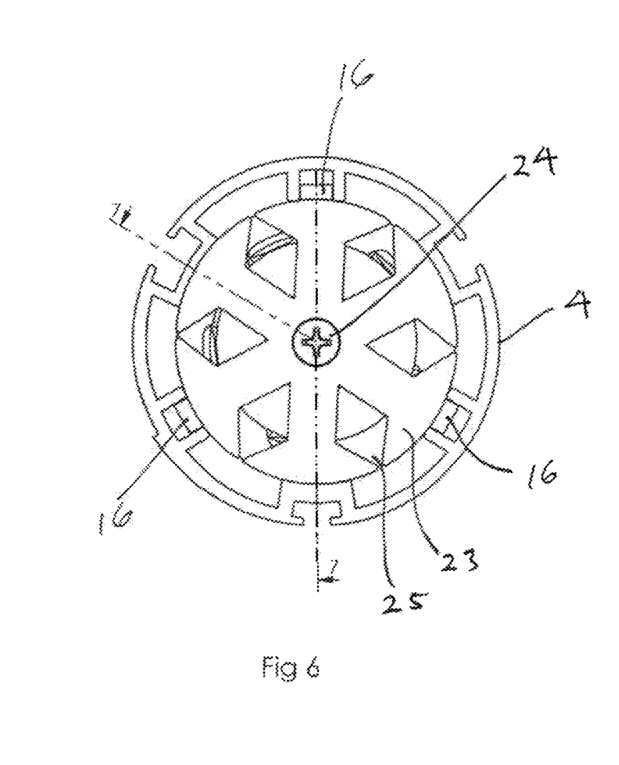
FIG. 6 is an end view of a roller tube having received therein an electric motor having a torque transfer coupler with an anti-slip feature in accordance with an alternate embodiment of the invention.

With specific reference to FIGS. 4 and 5, in accordance with the invention there is provided a torque transfer coupler 14 to transfer rotational torque from motor 7 to roller tube 4. Torque transfer coupler 14 is comprised of a central body 15 securable to inner end 10 of electric motor 7. Central body 15 is thus configured and dimensioned to be receivable within the interior of roller tube 4. Central body 15 also includes one or more torque transfer elements 16 that are dimensioned and configured to engage the interior of roller tube 4 when the motor is received therein, such that rotational torque applied to the central body is transferred to roller tube 4 through the interaction of torque transfer elements 16 and the interior of roller tube 4. In the particular embodiment of torque transfer coupler 14 shown in the attached drawings, central body 15 includes a central bore 17 that receives inner end 10 of motor 7. Commonly, inner end 10 of motor 7 will be splined, with the motor splines engaging corresponding splines or channels within bore 17 to permit central body 15 to be locked to electric motor 7. As shown, torque transfer elements 16 may be the form of ribs or ridges extending along the length of central body 15, generally parallel to the longitudinal axis of torque transfer coupler 14. Those ribs or ridges are received within or engage corresponding ribs, ridges or channels along the length of the interior surface of roller tube 4. Sliding electric motor 7 into roller tube 4, with torque transfer coupler 14 secured to inner end 10 of the motor, therefore causes torque transfer element 16 to engage features on the interior surface of the roller tube that effectively lock the torque transfer coupler to the tube. Rotation of torque transfer coupler 14 then causes a corresponding rotation of the roller tube. Preferably, torque transfer coupler 14 includes a plurality of torque transfer elements spaced about the exterior surface of the coupler to provide multiple points for the transfer of torque between the coupler and the roller tube. A plurality of torque transfer elements will also aid in centering the coupler, and hence the inner end 10 of electric motor 7, within the roller tube and to further help prevent motor wobble.

In accordance with one embodiment of the invention torque transfer coupler further includes an anti-slip member 18. Anti-slip member 18 is comprised of one or more resilient portions 19 that have a rest position and a deflected position. When resilient portions 19 are in their rest position (as shown in FIGS. 4 and 5) the exterior dimension (or circumference where the anti-slip member is of a generally circular configuration) is larger than the cross-sectional area of the hollow interior of roller tube 4. When in their deflected position, the exterior dimension or circumference of anti-slip members 18 is such that torque transfer coupler 14 is receivable within the hollow interior of roller tube 4, with resilient portions 19 remaining in at least a semi-deflected position and bearing against the interior surface of the roller tube. It will thus be appreciated that insertion of torque transfer coupler 14 into roller tube 4 causes resilient portions to move from their rest to their deflected positions, and to remain at least partially deflected. In accordance with this aspect of the invention, when in their deflected position and received within the interior of roller tube 4, resilient portions 19 engage the interior surface of the roller tube to resist the withdrawal of torque transfer coupler 14, and hence electric motor 8 secured thereto, from the interior of the roller tube. In order for torque transfer coupler 14 to resist the removal of electric motor 7 from the roller tube, the connection between torque transfer coupler 14 and inner end 10 of electric motor 7 will need to be secure in a longitudinal plane. To that end, a screw or other form of fastener (not shown) may be used to secure torque transfer coupler 14 to inner end 10 of electric motor 7 or, alternatively, any one of a wide variety of other mechanical or other locking structures or features may be employed.

In the embodiment of the invention shown in FIGS. 4 and 5, resilient portions 19 comprise a plurality of fingers that are spaced equally about the exterior surface of central body 15. In the particular embodiment that is depicted, the fingers are spaced about in equal groups of three, however, it will be appreciated that other groupings or a continuous ring of resilient portions or fingers could equally be used. Fingers 20 have inner ends 21 secured to the surface of central body 15 and outer ends 22 that engage the interior surface of the roller tube. In order to enhance the engagement of outer ends 22 and the interior surface of roller tube 4, outer ends 22 may end in a knife edge.

It is expected that in most instances fingers 20 will be integrally formed with central body 15 of torque transfer coupler 14. It is further expected that in most instances central body 15 and fingers 20 will be formed from a nylon, plastic, PVC or other similar type material that provides both the flexibility and resiliency required of fingers 20. Further, in order to assist in the insertion of torque transfer coupler 14 into roller tube 4, fingers 20 may, when in their rest position, angle slightly toward outer end 9 of electric motor 7.

It will thus be appreciated that when received within roller tube 4, fingers 20 of torque transfer coupler 14 will engage the interior surface of the roller tube in a manner that resists the withdrawal of the coupler from the tube. That is, any longitudinally oriented force applied to motor 7 attempting to withdrawal the motor from the roller tube will in turn be transferred to torque transfer coupler 14, and then in turn to fingers 20. Fingers 20 will be engaged or in essence "locked" within roller tube 4 by means of the frictional contact of outer ends 22 and the interior surface of the roller tube. Through designing the resiliency and flexibility of fingers 20 (including through choice material and dimensions) the amount of resistance to the withdrawal of the electric motor from the roller tube provided by fingers 20 can be designed so as to prevent the motor from accidentally sliding out of the roller tube if the "motor end" of the roller tube is lowered, but at the same time permitting motor 7 to be intentionally withdrawn from the roller tube by an installer or service personnel. One of ordinary skill in the art will further appreciate that the resiliency of fingers 20 and their spacing about the exterior surface of central body 15 will further help to concentrically retain torque transfer coupler 14 within the interior of roller tube 4.

FIGS. 6 through 10 show an alternate embodiment of resilient portions 19. In this embodiment resilient portions 19 comprise a generally circular disc that is, as in the case of fingers 20, preferably formed from flexibly resilient material. In this embodiment disc 23 is secured directly to inner end 10 of electric motor 7 through use of a fastener 24. Disc 23 has a rest position and a deflected position. When in its rest position the exterior dimension or circumference of disc 23 is larger than the interior diameter of the hollow bore within roller tube 4. The insertion of disc 23 into roller tube 4 thus causes the disc to move from its rest to its deflected position. By locating fastener 24 upon the longitudinal axis of electric motor 7, the insertion of disc 23 into roller tube 4, and its subsequent movement to a deflected position, will effectively centralize inner end 10 of electric motor 7 within roller tube 4.

Figure 8:
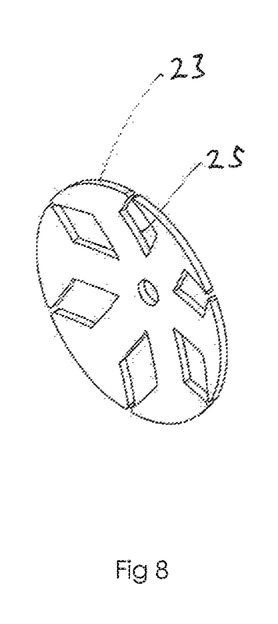
FIG. 8 is an upper rear perspective view of the anti-slip element of the torque transfer coupler shown in FIGS. 6 and 7.
Figure 9:
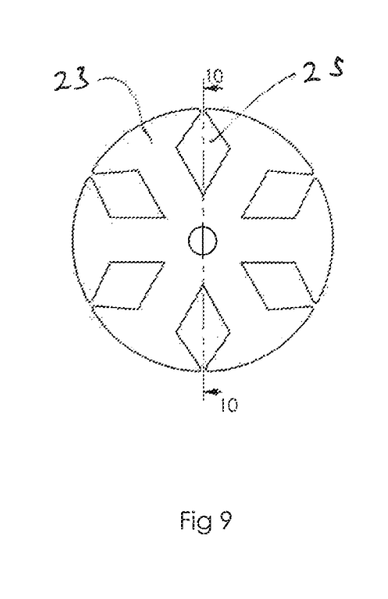
FIG. 9 is an end view of the anti-slip element of FIG. 8.
Figure 10:
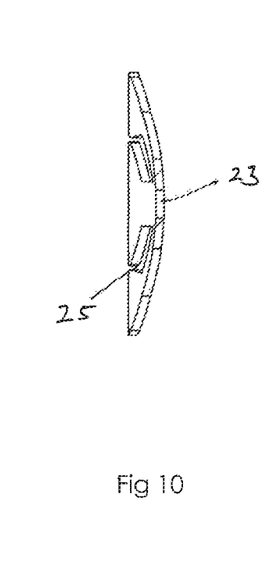
FIG. 10 is a sectional view taken along the line 10-10 of FIG. 9.

As shown best in FIGS. 8 through 10, flexible disc 23 includes a plurality of cut-outs 25 that permit the disc to move from its rest to its deflected position. That is, cut-outs 25 allow disc 23 to sufficiently flex in order for it to be received within roller tube 4. Once received within the roller tube, the resiliency of disc 23 causes its exterior surface to be driven into contact with the interior surface of the roller tube. To help enhance the frictional contact between the circumference of disc 23 and the interior of the roller tube, the outer edge of the disc may be sharpened or effectively a knife edge.

Figure 7:
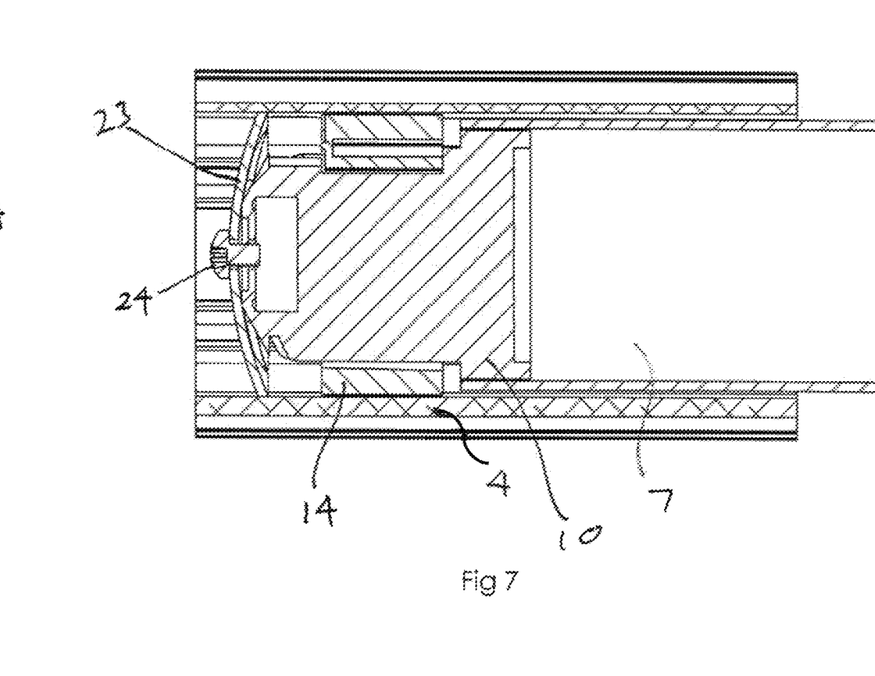
FIG. 7 is a sectional line taken along the line 7-7 of FIG. 6.

As shown best in FIGS. 7, 8 and 10, in one embodiment flexible disc 23 has a concave shape when in its rest position, wherein the concavity is directed toward electric motor 7 when the disc is secured thereto. The concave shape of flexible disc 23 helps to permit the disc to be received within roller tube 4 and also ensures that when the disc is received within the roller tube and moved to its deflected position, the disc will intersect the interior surface of the roller tube at an acute angle (relative to the concavity and the longitudinal axis of the electric motor). In this manner the interaction and frictional contact of the circumference of the disc with the interior surface of the roller tube in enhanced. One of ordinary skill in the art will appreciate that flexible disc 23 will operate in a manner generally similar to fingers 20 and will resist the withdrawal of electric motor 7 from roller tube 4. Only when sufficient force is applied to outer end 9 of electric motor 7 to counteract the function of flexible disc 23, can the motor be removed from the roller tube.

From a thorough understanding of the above described invention one of skill in the art will appreciate that there is provided a torque transfer coupler that both assists in the transmission of torque from electric motor 7 to roller tube 4, and also helps to center the inner end of the motor within the roller tube to prevent vibration and wobble. There is also provided an anti-slip member, that assists in preventing the motor from accidentally sliding out of the end of roller tube 4.

It is to be understood that what has been described are the preferred embodiments of the invention. The scope of the claims should not be limited by the preferred embodiments set forth above, but should be given the broadest interpretation consistent with the description as a whole.

I claim:

1. A torque transfer coupler for a roller blind, the roller blind having a roller tube with a generally hollow interior capable of receiving an end of an electric motor therein, the electric motor imparting rotational movement to the roller tube, the torque transfer coupler comprising:
   a generally circular, flexibly resilient, disc releasably secured to an end of the motor, said disc having a rest position and a deflected position, an exterior diameter of said disc larger when in said rest position than when in said deflected position, when in said rest position the exterior diameter of said disc larger than a cross sectional area of the hollow interior of the roller tube such that insertion of said disc into the roller tube causes said disc to be moved to said deflected position wherein an exterior edge of said disc engages an interior surface of the roller tube to assist in the transmission of rotational torque from the motor to the roller tube and to resist the withdrawal of the electric motor from the hollow interior of the roller tube.

2. The torque transfer coupler as claimed in claim 1, wherein said disc has a concave shape when in said rest position, said concavity directed toward the electric motor when said disc is secured thereto.

3. The torque transfer coupler as claimed in claim 2, wherein said disc includes a plurality of cut-outs that permit said disc to move from its rest to its deflected position.

4. The torque transfer coupler as claimed in claim 2, wherein said disc has an outer circumferential edge in the form of a knife edge to enhance frictional contact between said disc and the interior surface of the roller tube.

* * * * *